Oct. 15, 1946.  A. B. BLOMQUIST  2,409,415
UNIVERSAL BENCH GRINDER
Filed June 20, 1945  2 Sheets-Sheet 1
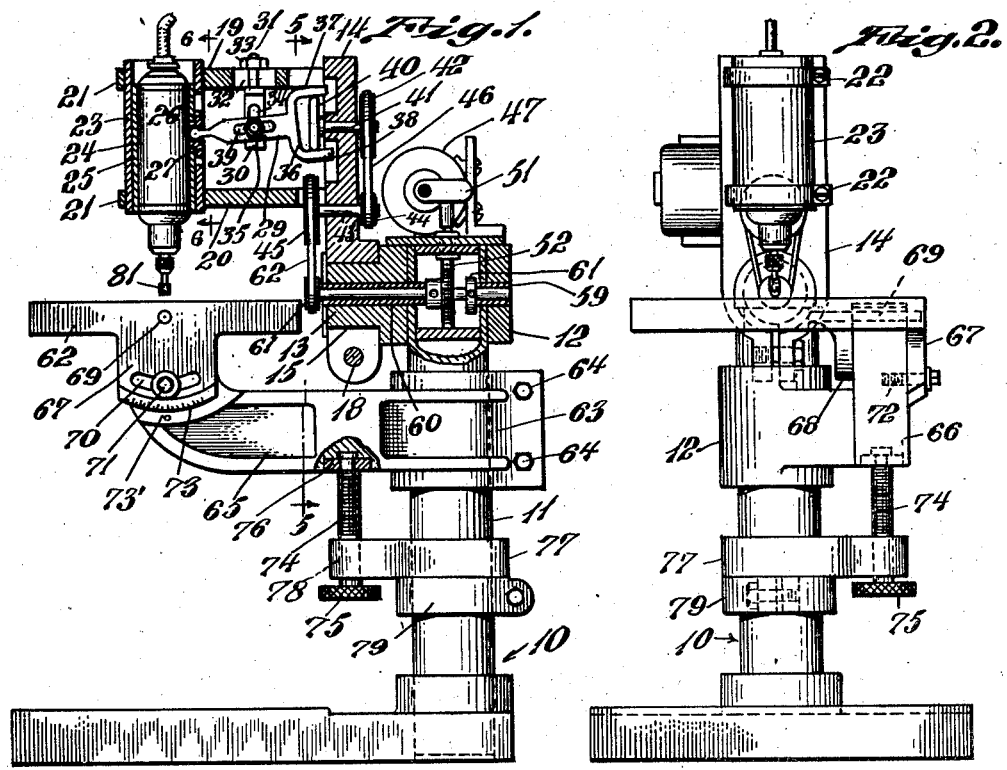
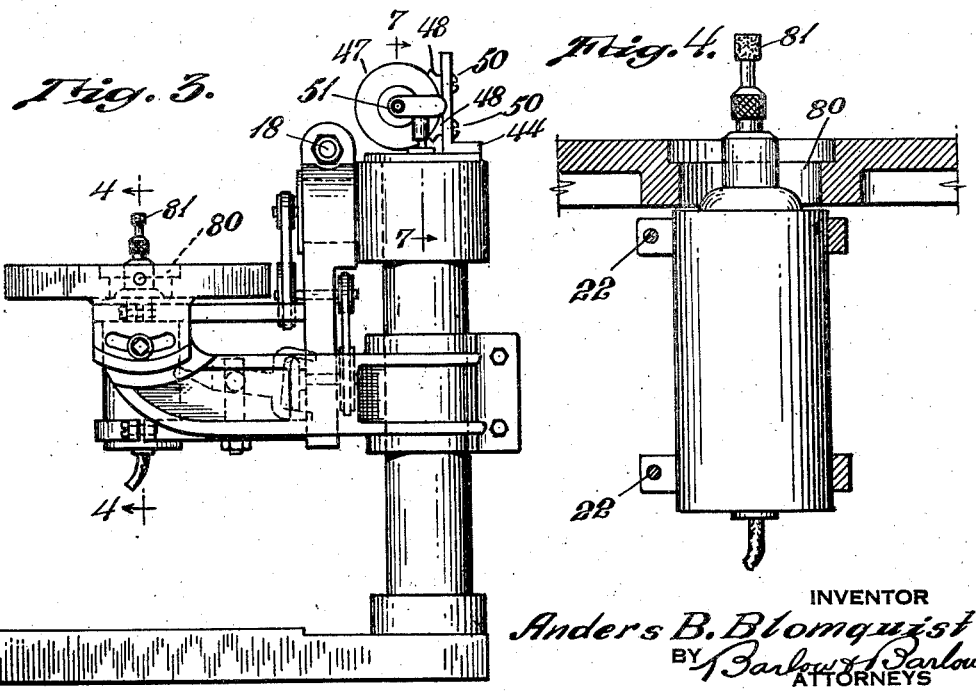
INVENTOR
Anders B. Blomquist
BY Barlow & Barlow
ATTORNEYS Oct. 15, 1946.   A. B. BLOMQUIST   2,409,415
UNIVERSAL BENCH GRINDER
Filed June 20, 1945   2 Sheets-Sheet 2
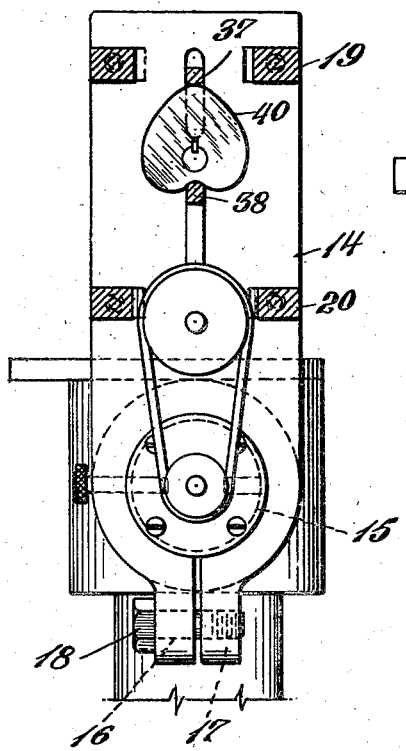
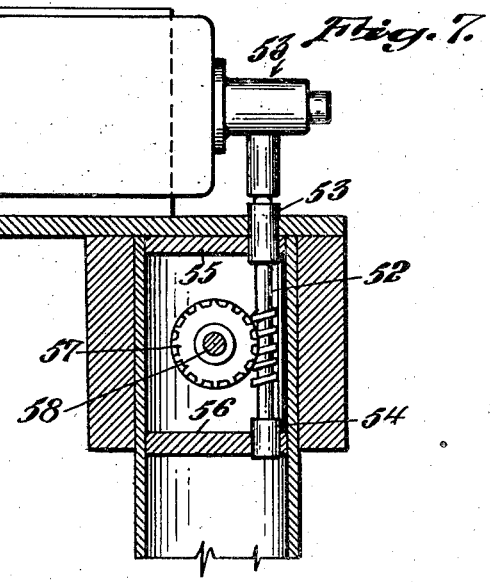
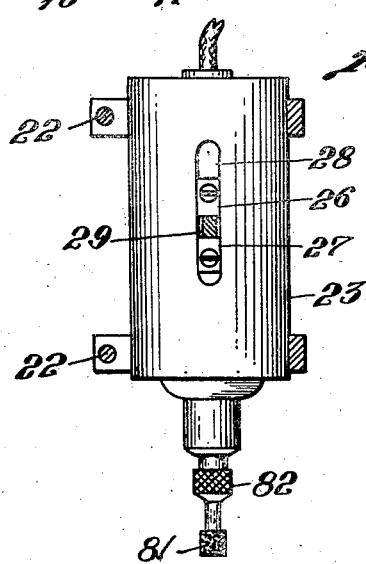
INVENTOR
Anders B. Blomquist
BY Barlow & Barlow
ATTORNEYS Patented Oct. 15, 1946

2,409,415

UNITED STATES PATENT OFFICE 2,409,415

UNIVERSAL BENCH GRINDER

Anders Bernhard Blomquist, Cranston, R. I.

Application June 20, 1945, Serial No. 600,521

6 Claims. (Cl. 51—34)

This invention relates to a machine tool, particularly a machine which utilizes abrasive means for removing excessive material from a work piece.

In making dies, gauges and like tools, it is often necessary after subjecting the tool to a hardening process to manually remove, such as by honing or hand grinding, surplus material from the tool at locations thereon not accessible to machine tools now in use.

It is an object of this invention to provide a machine tool which will be adaptable for more complete use in the removal of material from dies, gauges and like tools after subjecting the same to a hardening process.

Another object of the invention is the provision of a machine tool of the above character in which the cutting tool will be provided with a reciprocal motion.

Another object of the invention is the provision of a machine tool of the above character in which a rotating cutting tool will be additionally provided with a reciprocating motion.

Another object of the invention is the provision of a machine tool of the above character in which the cutting tool may be positioned to operate upwardly or downwardly upon the work.

Another object of the invention is the provision of a machine tool of the above character in which the cutting tool support may be rotated through 360°.

Another object of the invention is the provision of a machine tool of the above character in which the tool may be rotated and reciprocated by sources of power which are independent from each other.

Another object of the invention is the provision of a machine of the above character in which a work support may be angularly positioned with respect to the cutting tool.

With these and other objects in view, the invention consists of certain novel features of construction, as will be more fully described and particularly pointed out in the appended claims.

In the accompanying drawings:

Fig. 1 is a side elevation partly in section of a machine embodying my invention;

Fig. 2 is a front elevational view of the machine;

Fig. 3 is a side elevational view of the machine with the cutting tool and supporting structure positioned at a location opposite to that shown in Fig. 1;

Fig. 4 is a view partly in section taken substantially along line 4—4 of Fig. 3;

Fig. 5 is a sectional view taken substantially along line 5—5 of Fig. 1;

Fig. 6 is a sectional view taken substantially along line 6—6 of Fig. 1; and

Fig. 7 is a sectional view taken substantially along line 7—7 of Fig. 3.

In proceeding with this invention I rotatably mount a cutting tool which may be a grinding wheel of a size and form appropriate to the nature of the work to be operated upon. The wheel is provided with a reciprocal motion and is mounted in such a manner as to approach the work either from above or below or at such an angle as may be found desirable.

Referring to the drawings for a more detailed description of the invention 10 designates a base from which there extends an upright or column 11 at the upper end of which there is fixed a bracket 12. The bracket 12 has a bearing in the form of a trunnion 13, the axis of which extends substantially horizontal or at right angles to the column 11. Rotatably mounted on the bracket 12 is a grinding head which comprises a support 14 provided with an opening 15 which is split and in which is received the trunnion 13. The walls of this opening terminate in spaced ears provided with aligned openings 16 and 17 (see Fig. 5). The opening 17 is threaded and receives a screw bolt 18 which extends through opening 16 to adjustably secure the support on the bracket 12.

From the support 14 there extends in spaced substantial parallel relation arms 19, 20, each of which is provided at the outer end with a clamp portion 21 in which there is provided an opening the wall of which extend into spaced ears and are pierced to receive clamp screws 22. A bearing sleeve 23 is mounted within the openings of the clamps and provides a bearing in which a motor 24 is slidably mounted. This motor is provided with an outer sleeve 25 to which there are secured spaced shoes 26, 27. These shoes extend through an elongated opening 28 provided in the outer sleeve 23 and provide a bearing opening which receives the end portion of a lever 29 which is rockable to reciprocate the motor in the outer sleeve 23.

Lever 29 is fulcrumed on hanger 30, one end of which terminates into a reduced threaded portion 31 located in elongated slot 32 provided in the arm 19. A nut 33 engages the threaded portion 31 and secures the hanger 30 in adjustable position along the slot 32. The hanger 30 is also provided with an elongated slot 34 and receives a pivot stud 35 which is adjustably secured along the slot 34. The lever 29 is bifurcated at its end portion 36 providing arms 37, 38 and also has an elongated slot 39 which receives the stud 35 to pivotally mount the lever on the hanger 30. The arrangement provides for changing the position of the lever in a horizontal and in a vertical direction.

A cam 40 is positioned between the arms 37, 38 and engages the same to rock the lever about the stud 35 and thus reciprocate the motor 24 in the sleeve 23. This cam is fixed on one end of a shaft 41 which is journaled in the support 14. The other end of the shaft carries a pulley 42. A second shaft 43 is also journaled in the support 14 and carries a pulley 44 at one end thereof and a pulley 45 at the other end. Pulley 44 is aligned with pulley 42 and a belt 46 operatively connects the pulleys.

In order to provide motion for the cam 40 a motor 47 is mounted at the upper end of the column 11 by means of abutments 48 on the motor at a position to engage the surface of an L-shaped bracket 49. The motor is secured to this bracket by means of screw bolts 50. A speed reducing mechanism 51 is attached to the motor 47. From this mechanism 51, there depends a worm shaft 52 which is journaled in bearings 53, 54 (see Fig. 7) secured to the upper and lower plates 55, 56 which are fixed to the column in any appropriate manner such as by frictional engagement with the inner walls of the column 11. This worm shaft 52 engages a worm gear 57 fixed on a shaft 58. The shaft 58 extends substantially concentric with the axis of the trunnion 13 and is journaled in bearing bushings 59 and 60. A collar 61 surrounds the shaft and engages the end of bushing 59. The worm gear 57 abuts against the end of bushing 60 thus preventing axial movement of the shaft in its bearings. The shaft 58 extends beyond the support 14 and mounts a pulley 61 which is aligned with pulley 45. An endless belt 62 operatively connects these pulleys 45 and 61. Thus, motion is transmitted from the motor 47 to the cam 40 through the speed reducing mechanism 51, worm 52, worm gear 57, shaft 58, pulleys 61, 45, shaft 43, pulleys 44, 42 and shaft 41.

A work supporting table 62 is swivelly mounted on the column 11 by means of a bracket 63 which is adjustably slidable and secured in position on the column by bolts 64. The bracket is provided with an arm 65 positioned at one side of the center of the table and has an upwardly extending portion 66 which is received between ears 67, 68 depending from the table 62 from an edge portion thereof. The table 62 is pivotally mounted with relation to the portion 66 by means of a pivot pin 69 extending through portion 66 and through the ears 67, 68. The ear 67 is provided with an arcuate slot 70 through which there extends a lock bolt 71 threadedly engaging opening 72 in the portion 66. The lower portion of the ear 67 may be provided with graduations 73 and the portion 66 with a datum line 73' so as to indicate the position of the surface of the table relative to the vertical.

The table may be raised or lowered by means of a threaded member 74 provided with an enlarged head 75 and fixed against longitudinal movement along the arm 65 in a manner to permit rotation thereof as at 76. A collar 77 is swivelly mounted on the column 11 and has a threaded opening 78 through which extends the threaded member 74. A clamp collar 79 is adjustably mounted on the column 11 and provides an abutment against which the collar 77 rests. A central opening 80 is provided in the table to receive the abrasive wheel 81 enabling it to move beyond the surface of the table when the wheel reciprocates. The wheel 81 is secured to the spindle of motor 24 by means of a chuck 82 and may be of a size and shape which is appropriate for the nature and character of the work to be handled.

In the operation of the machine the motors are set in motion, the motor 24 rotating the abrasive wheel 81 and the motor 47 reciprocating the abrasive wheel 81 in a manner above described. The work rests upon the surface of the table 62 which has been adjusted to the desired position. The work is then manually moved to the abrasive wheel and manipulated in an appropriate manner so as to remove such material as is desired from the work. When it is desired to change the location of the grinding head from a position above the table 62, as shown in Fig. 1, to a position beneath the table, as shown in Fig. 3, the bolts 64 are loosened and the table swiveled about the column 11 to a position which is out of the path of travel of the grinding head, the collar 77 moving with the bracket 63 because of its connections and the support 14 is free to be moved about trunnion 13. The table 62 is next raised to clear the abrasive wheel 81, then swung about the column to align opening 80 with the axis of the tool 81 and permit passing of the table thereover. To place the grinding head in the position shown in Fig. 1 it is merely necessary to reverse the operation above described.

It will now be apparent that I have provided a machine in which the abrasive tool supporting head may be swung through 360° to position the same at a location which is appropriate to the character of operation to be accomplished. It will also be apparent that the motor 24 may remain idle and the abrasive wheel 81 exchanged for such abrasive member which is operated by the reciprocation thereof. The speed of reciprocation may be chosen by the exchange of driving pulleys.

I claim:

1. A machine tool having a grinding head mounted for movement through an arc greater than 180°, a motor slidably mounted in said head, means for attaching an abrasive wheel to the spindle of said motor, a rockably mounted lever engaging said motor, and a cam engaging said lever for reciprocating said motor.

2. A machine tool having a base, a bearing carried by said base and extending in a horizontal direction, a grinding head rotatably mounted by said bearing for rotation in a vertical plane, an abrasive wheel carried by said head, and means for reciprocating said wheel including a pulley mounted for rotation about the axis of said bearing.

3. A machine tool having a work support, a grinding head mounted for rotative movement about a horizontal axis relative to said support through an arc greater than 180° and movable to position said grinding head from a location above said support to a position beneath said support.

4. A machine tool having a base, an upright extending from said base, a trunnion carried by said upright at substantially right angles thereto, a grinding head rotatably mounted on said trunnion for movement through an arc greater than 180°, a motor slidably mounted in said head, means for attaching an abrasive wheel to the spindle of said motor, a work support movable mounted on said upright at a location to be positioned beneath said trunnion, said grinding head being movable to be positioned from a location above said support to a position at a location beneath said support, said support having an opening through which said abrasive wheel may extend when positioned beneath said support.

5. A machine tool having a base, an upright extending from said base, a trunnion carried by said upright at substantially right angles thereto, a grinding head rotatably mounted on said trunnion for movement through an arc greater than 180°, a motor slidably mounted in said head, means for attaching an abrasive wheel to the spindle of said motor, a work support movably mounted on said upright at a location to be positioned beneath said trunnion and extending in the path of movement of said grinding head, said grinding head being movable to be positioned from a location above said support to a position at a location beneath said support, said support being movable out of the path of movement of said grinding head when moved from a location above or beneath said support, said support having an opening through which said abrasive wheel may extend when positioned beneath said support.

6. A machine tool having a base, an upright extending from said base, a trunnion carried by said upright at substantially right angles thereto, a grinding head rotatably mounted on said trunnion for movement through an arc greater than 180°, a motor slidably mounted in said head, means for attaching an abrasive wheel to the spindle of said motor, a work support movably mounted on said upright at a location to be positioned beneath said trunnion, said grinding head being movable to be positioned from a location above said support to a position at a location beneath said support, said support having an opening through which said abrasive wheel may extend when positioned beneath said support, a lever rockably mounted in said grinding head and engaging said motor, a cam carried by said head and engaging said lever for rocking the same for reciprocating said motor.

ANDERS BERNHARD BLOMQUIST.